March 19, 1963  R. M. ANSEL  3,081,673
METHOD AND APPARATUS FOR SHEARING WELDED RAIL JOINTS
Filed April 27, 1959  2 Sheets-Sheet 2
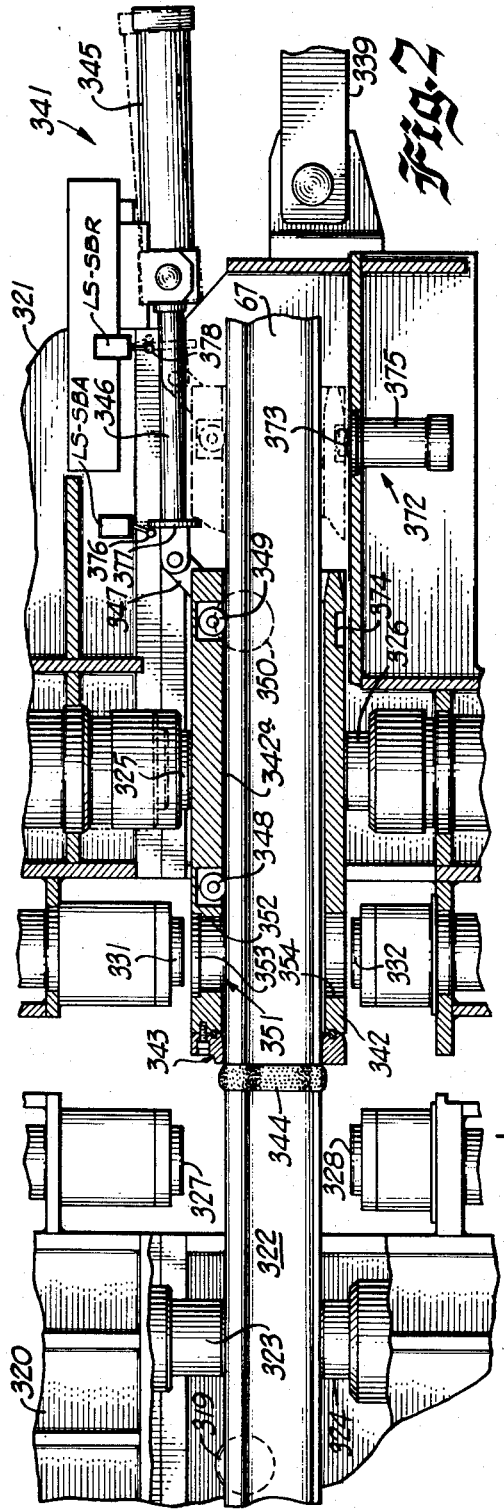
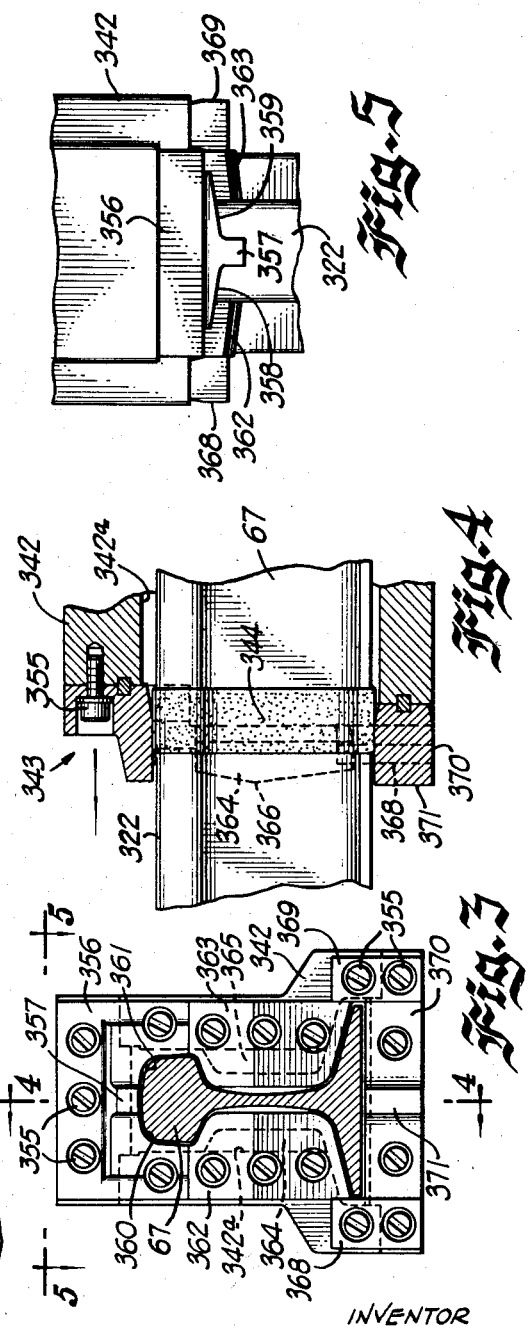
INVENTOR
RICHARD M. ANSEL
BY Mason, Kolehmainen,
Rathburn and Wyss
ATTORNEYS

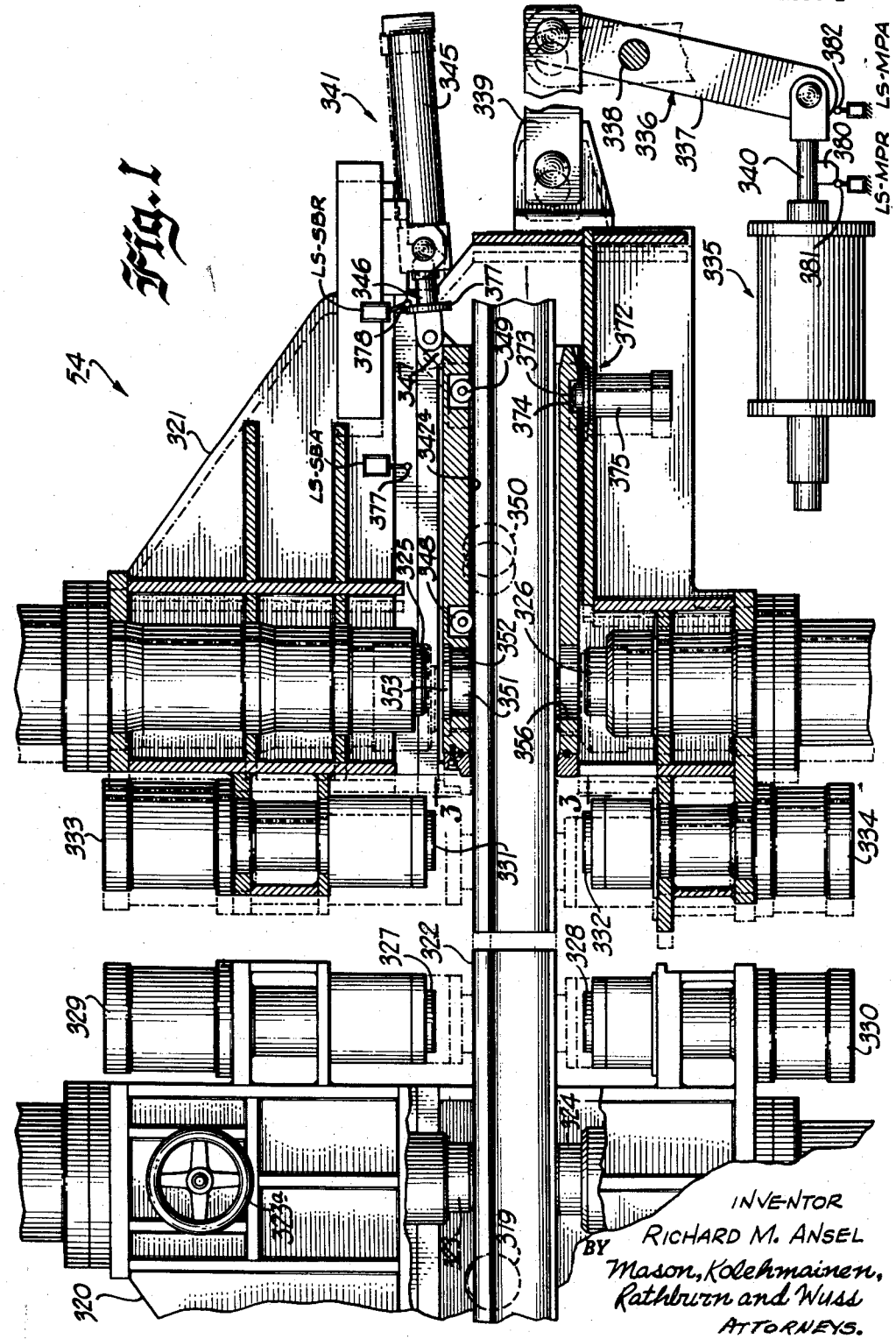

United States Patent Office 3,081,673
Patented Mar. 19, 1963

3,081,673
METHOD AND APPARATUS FOR SHEARING WELDED RAIL JOINTS
Richard M. Ansel, Oak Park, Ill., assignor to Chemetron Corporation, Chicago, Ill., a corporation of Delaware
Filed Apr. 27, 1959, Ser. No. 809,184
12 Claims. (Cl. 90—24)

The present invention relates generally to a method and apparatus for use in forming a continuous rail by welding together individual rail sections in end to end relationship and the invention is more particularly concerned with a new and improved shearing method and apparatus for removing a major portion of the excess weld metal surrounding a welded joint between the rail sections.

For a number of years it has been evident that the use of railroad tracks in the form of rail sections welded together to form a continuous strip is particularly desirable because such a construction not only increases the riding comfort of railroad passengers and reduces the shock and vibration to which rail freight is subjected but, at the same time, is substantially trouble free and, hence, requires considerably less maintenance than tracks of the type employing individual rail sections bolted or otherwise secured together. Despite the knowledge of these advantages, however, the use of welded rails has not been wide spread due partly to their excessive cost and also to the inordinate amount of time usually required to form the welded joint for the rail sections. More specifically, in order to form an efficient welded joint, it is necessary not only to weld the rail sections together but also to shear off the upset or excess weld metal and/or to grind the rail in order to form smooth surfaces for the rail base and for the running surface adapted to accommodate the wheels of the railroad car. In prior art arrangements, the removal of the excess weld metal or upset region surrounding the welded joint has been an acute problem. Thus, in these arrangements, while one or more shearing operations have been performed on the welded joint, the shearing has generally been accomplished by moving the weld past fixed shearing dies or blades. However, a shearing operation of this type is not satisfactory because the weld metal cools considerably as it passes from the weld area to the shearing dies or blades and, as a consequence, this metal becomes very hard and difficult to cut. Thus, the upset cannot be sheared close to the rail surface and large quantities of metal remain for removal by grinding. Both the grinding time and the labor required to perform the grinding operation are, therefore, increased with the result that the cost of production of the welded joint becomes excessive. Moreover, in many cases, effective shearing can be obtained only by several passes through the shearing device and this too increases the production time and the cost involved in forming the continuous rail.

It would, of course, be desirable to provide an apparatus for shearing the weld upset as soon as possible after the weld is made so that the metal will still be soft and relatively easy to cut and the satisfaction of this desire constitutes one of the primary objects of the present invention.

It is another object of the present invention to provide a new and improved method and apparatus for shearing the excess metal surrounding a welded joint in a rail much more effectively than devices of prior construction.

A further object of the invention is to provide a novel shearing apparatus of the character described above wherein the shearing is accomplished by means of a shear box surrounding the rail and movable through the upset metal as soon as the welding operation is completed.

It is also an object of the present invention to provide a new and improved shear box which is so constructed that it can be located in the weld area without interfering with the welding electrodes or other components used in performing the welding operation.

It is a further object of the invention to provide a new and improved shear box of the character indicated above which is provided with shearing blades so constructed and arranged that excessive force is not required to drive the blades through the weld upset.

The invention has for another object the provision of a new and improved shear box carrying shearing blades so arranged that the blades are not subjected to excessive wear and, hence, have relatively long operating lives.

The foregoing and other objects are realized in accordance with the present invention by providing a shearing mechanism for use in conjunction with an electric flash welding apparatus which performs the welding operation by passing current from electrodes through the ends of the rail sections to be joined together, moving the rail sections back and forth to flash the ends of the rail sections until they are heated and then forcing the rail sections together to complete the weld. When the ends of the rail sections are forced together, an upset of metal is pushed out around the welded joint and, in order to remove a major portion of this upset, as soon as the welding operation is completed, a shear box carrying shearing blades is rendered automatically effective to remove a major portion of the upset metal.

The walls of the shear box are provided with openings for receiving clamps which are movable into engagement with one of the rail sections during the welding operation. The latter clamps secure the rail section to a movable carriage which is reciprocated to flash the ends of the rails and is advanced to form the joint at the completion of the welding operation. When the weld has been formed the clamps are retracted to permit relative movement between the shear box and the carriage. The shear box is thus advanced by a piston and cylinder assembly to a point where its shearing blades are disposed adjacent the weld upset whereupon the clamps are reapplied. At this time the clamps are no longer aligned with the openings in the shear box and, hence, they engage the shear box walls to clamp the box to the carriage. The carriage is then advanced by a piston and cylinder assembly in order to drive the shearing blades through the upset. The blades are so arranged that they engage the upset at different times thus minimizing the force required to perform the shearing and, at the same time, reducing wear on the blades. The shearing is completed in a single pass and the carriage is retracted whereupon the clamps are released and the shear box is returned to its retracted position.

The invention, both as to its organization and method of operation, together with further objects and advantages thereof, will best be understood by reference to the specification, taken in conjunction with the accompanying drawings in which:

FIG. 1 is a fragmentary sectional view illustrating a shearing mechanism characterized by the features of the present invention;

FIG. 2 is an enlarged fragmentary sectional view illustrating the operation of the shear box employed in the mechanism shown in FIG. 1;

FIG. 3 is an enlarged sectional view taken along a line substantially corresponding to lines 3—3 in FIG. 1 and shows particularly the construction of the shearing blades attached to the shear box;

FIG. 4 is a sectional view taken along a line substantially corresponding to line 4—4 in FIG. 3; and FIG. 5 is a fragmentary top plan view of the end of the shear box as seen looking in the direction of the arrows 5—5 in FIG. 3.

Referring now to the drawings and first to FIGS. 1 and 2 thereof, the welding apparatus and the shearing mechanism of the present invention is there identified generally by the reference numeral 54. The welding apparatus, exclusive of the shearing mechanism is generally similar to the arrangement disclosed in United States Patent No. 2,781,026 of Hans Alfred Schlatter and Emil Wegmann. More particularly, the welding apparatus itself is of the flash welding type wherein a continuous rail indicated by reference numeral 322 is held stationary while a movable rail section 67 (FIG. 2) is moved toward and away from the butt end of the continuous rail in order to draw an arc between the rail sections for the purpose of producing heat and, when the end portions of the rail sections are sufficiently heated, the parts are suddenly pushed together with a large force in order to fuse the ends together. As described in the above identified Patent No. 2,781,026, the welding machine includes a stationary base only a portion of which is visible in FIG. 1 and this portion is indicated by the reference numeral 320. A movable platen or carriage 321 is mounted for sliding movement upon the base 320 within suitable guideways shown at the right side of the base as viewed in FIG. 1. The continuous rail 322 is formed from several rail sections welded together during previous welding operations and is held in fixed position upon the base 320 by means of a pair of aligned vertical clamps 323 and 324 respectively acting upon the top running surface and the bottom of the rail base and by a pair of aligned horizontal clamps one of which is indicated in FIGS. 1 and 2 by the dotted line 319. The horizontal clamps act at right angles to the vertical clamps 323 and 324 and are adapted to be moved into engagement with the side edges of the top running surface of the rail. The movable carriage 321 carries the movable rail section 67 and, to this end, the carriage is provided with a pair of aligned vertical clamps 325 and 326 respectively acting upon the top running surface and the bottom of the base of the rail section together with a pair of aligned horizontal clamps which act at right angles to the clamps 325 and 326 and are adapted to be moved into engagement with the side edges of the top of the rail section. One of the horizontal clamps is indicated by the broken line 350 in FIGS. 1 and 2 and this clamp cooperates with its associated horizontal clamp to prevent lateral movement of the rail section during the welding and shearing operations. All of the clamps described above are moved by suitable fluid operated piston and cylinder assemblies between a retracted position where they are out of engagement with the rail and an extended position where they are seated against the rail surface. The two pairs of vertical clamps 323, 324 and 325, 326 and the two pairs of horizontal clamps are of the type described in detail in United States Patent No. 2,787,698 issued April 2, 1957, to Hans Alfred Schlatter and Emil Wegmann and, hence, one of the clamps of each pair acts as a stop member while the other clamp of each pair acts as a pressure member for forcing the rail against the stop member in order to hold it firmly during the welding and shearing operations. The position of the stop member of each pair may be adjusted to align the rail section 67 and the continuous rail 322 prior to making the weld. This adjustment is made in the manner described in Patent No. 2,787,698 referred to above and for the clamp 323 it is accomplished by manually turning a wheel 323a. A similar hand operated wheel is, of course, provided for the stop members of the remaining pairs of clamps but these are not shown in the drawings. As described in Patent No. 2,787,698, the total force applied to the stop member of each pair of clamps exceeds that applied to the pressure member in order to prevent the latter from overcoming the former and disturbing the alignment.

For the purpose of supplying current to the continuous rail 322 and to the movable rail section 67 to perform the welding operation, the base 320 also supports a pair of welding electrodes or contacts 327 and 328 movable into engagement with portions located near the trailing end of the continuous rail. The electrode receiving portions near the trailing end of the continuous rail may be ground and cleaned prior to the welding operation as, for example, by means of a spot grinder of the type described and claimed in copending application Serial No. 808,200, filed April 22, 1959, and now abandoned but refiled as application Serial No. 193,036 on April 25, 1962, both of which applications are assigned to the same assignee as the present invention. The electrodes 327 and 328 are movable between a retracted position shown in solid lines in FIGS. 1 and 2 and an extended or applied position illustrated by the broken lines in FIG. 1. The movement of the electrodes 327 and 328 between these positions is respectively accomplished by piston and cylinder assemblies 329 and 330 of conventional construction energized from a fluid source either hydraulic or pneumatic which is preferably the same source used in the operation of the piston and cylinder assemblies for the rail clamps. The movable carriage 321 also carries a pair of electrodes or contacts 331 and 332 which are respectively moved by piston and cylinder assemblies 333 and 334 between a retracted position (indicated by solid lines in FIGS. 1 and 2) where they are out of engagement with the rail section 67 and an extended position (illustrated in broken lines in FIGS. 1 and 2) where the ends of the electrodes respectively contact portions of the top running surface of the rail section and the underside of the rail base. Here again, the electrode receiving portions near the leading end of the rail section 67 may be ground or cleaned by the spot grinder referred to above. The piston and cylinder assemblies 333 and 334 are, of course, energized from the same source as the assemblies 329 and 330.

As was indicated above, the movable carriage 321 is adapted to slide horizontally along the base 320 between a retracted position indicated in solid lines in FIG. 1 and an extended position indicated by the broken lines, this movement being controlled by a piston and cylinder assembly 335 which is preferably hydraulically actuated by oil supplied from a suitable pump. The piston rod 340 of the assembly 335 is connected to one end of the carriage through a linkage 336 including a lever 337 mounted for pivotal movement about a fulcrum pin 338 carried on the base 320. More specifically, the lever is pivotally connected at one end to a fixed arm 339 on the carriage 321 and at the other end is pivotally joined to the piston rod 340. The piston and cylinder assembly 335 is of the type described in the above identified Schlatter et al. Patent No. 2,781,026 and the air flow to this assembly is controlled in the manner described in this patent so that the assembly is effective to move the carriage 321 back and forth while it is being advanced from its retracted position to its extended position. More specifically, the carriage is reciprocated while it is being advanced thus moving the leading end of the rail section 67 toward and away from the trailing end of the continuous rail 322 during the welding operation in order to heat uniformly the two ends. The manner in which the piston and cylinder assembly 335 is operated to accomplish the described movement of the carriage is set forth in detail in Patent No. 2,781,026 and, as described therein, when the ends of the rails have been heated sufficiently, the carriage 321 is moved to the left as viewed in FIG. 1 with a large force to complete the welding process by pushing the leading end of the rail section 67 against the trailing end of the continuous rail 322, thereby causing the molten metal to fuse together and form a solid joint. This process creates an upset 344 of metal surrounding the welded joint and this upset must, of course, be removed before the rail can be used.

In accordance with the present invention, the welding apparatus 54 is provided with a new and improved mechanism for shearing off the upset metal surrounding the welded joint and this device is indicated in the drawings by the reference numeral 341. The shearing device 341 includes an elongated shearing box 342 mounted for sliding movement upon the carriage 321. This box is movable from a retracted position illustrated in FIG. 1 to an extended position shown in FIG. 2 and in the extended position a plurality of shearing blades 343 affixed to the front end of the shearing box are disposed immediately adjacent the upset material surrounding the welded joint. The shear box 342 is adapted to be moved between its retracted and extended positions by means of a piston and cylinder assembly 345 mounted upon the movable carriage 321 and having its piston rod 346 secured through a connecting link 347 to the box 342. The actual shearing is accomplished, as will be described more fully hereinafter, by admitting oil to the piston and cylinder assembly 335 to move the carriage 321 to its extended position, thus driving the shearing blades 343 through the metal upset 344.

The shearing box 342 is, in effect, a hollow structure of rectangular cross section with walls formed of heavy steel plates having sufficient strength to withstand the shearing force. The shear box has a through opening 342a dimensioned loosely to receive the rail section and, hence, it is capable of handling a number of different size rails within the range of its dimensions but it may be necessary in some instances to replace the shear box with one having different dimensions in the event that the cross section of rail sections to be handled falls beyond the range. To facilitate the movement of the shear box 342 along the rail the box carries internally a plurality of spaced apart rollers 348 and 349 which are adapted to engage and roll along the top running surface of the rail when the shear box is being extended or retracted. These rollers are mounted upon suitable spring pressed supports having biasing springs acting to urge the rollers downwardly as viewed in FIGS. 1 and 2. The shear box may also be provided with side guides which are not shown in the drawings but which function to guide the movement of the box along the rail and to aid in aligning the rail in the welding machine. These side guides are preferably adjustable laterally of the rail and the mountings for the rollers 348 and 349 are preferably adjustable vertically so that rail sections of different dimensions can be accommodated.

During the welding operation, the shear box 342 is retracted so that the electrodes 331 and 332 may move into engagement with the rail section 67 but, as is clearly shown in FIG. 1, even when retracted the shear box is disposed in the path of movement of the vertical clamps 325 and 326 and the pair of horizontal clamps including the clamp 350. However, as indicated above, both of these pairs of clamps must be extended and rendered effective to hold the rail section 67 in position during the welding operation. To this end, the clamp 325, when extended, engages a hardened insert plate 351 accommodated within an opening 352 formed in the top wall of the shear box. The insert plate 351 includes an enlarged head 353 seating within an enlarged diameter portion of the opening 352 and a smaller diameter portion extending through the opening 352 and protruding into the opening 342a in the shear box. The thickness of the insert plate 351 is determined by the height of the rail section 67 and, as a result, different insert plates are used for rail sections of different dimensions. The vertical clamp 326 on the other hand extends through an opening 354 formed in the bottom wall of the shear box and vertically aligned with the opening 352. The opening 354 is preferably somewhat larger in diameter than the clamp 326 in order to permit the latter clamp to extend freely therethrough and into engagement with the underside of the base of the rail section 67. When the clamp 326 is extended, the rail section 67 is lifted and is seated firmly against the bottom or inwardly protruding portion of the hardened insert 351 at the same time raising the rollers 348 and 349 against their spring mountings. In similar manner, when the horizontal clamps on the carriage 321 are extended one of these clamps seats against a hardened insert plate (not shown) which is identical to the plate 351 described above but is carried by one side wall of the shear box. The other horizontal clamp extends through an opening formed in the other side wall and aligned with the latter insert plate. These horizontal clamps cooperate with the vertical clamps 325 and 326 to lock the rail section 67 to the carriage 321 during the welding operation.

During the welding operation, the shear box 342 is locked in its retracted position by means of a latching mechanism indicated by the reference numeral 372 in FIGS. 1 and 2. This mechanism includes a latching dog 373 movable between a retracted position shown in solid lines in FIG. 2 and an extended position shown in broken lines wherein it projects into a dog receiving notch 374 formed in the base or lower wall of the shear box. The movement of the dog 373 is controlled by a single acting piston and cylinder assembly including a biasing spring (not shown) urging the dog towards its extended position. When it is desired to release the latching mechanism 372 in order to extend the shear box, fluid under pressure is admitted to the piston and cylinder assembly 375 to force the piston of the latter assembly downwardly against the action of the biasing spring in order to withdraw the latching dog 373 from the notch 374 and, hence, to permit the forward or advance movement of the shear box 342. Fluid for operating the latching assembly 372 is supplied simultaneously with the fluid for extending the piston and cylinder assembly 345. When the shear box 342 has been returned to its retracted position by interruption of the flow of fluid pressure to the piston and cylinder assembly 345, the fluid circuit to the piston and cylinder assembly 375 has also been broken and, as a consequence, the biasing spring again becomes effective to seat the latching dog 373 within the notch 374 to lock the shear box in retracted position.

When the welding operation is completed, both pairs of clamps are released or retracted and the carriage 321 is returned to its retracted position by the piston and cylinder assembly 335. The return movement of the carriage is facilitated by the rollers 348 and 349 rolling along the top running surface of the rail. The continuous rail 322 is still held in position by the pair of stationary vertical clamps 323 and 324 and by the pair of stationary horizontal clamps including the clamp 319.

The shearing portion of the cycle now begins as soon as possible since it is desirable to shear the upset 344 while the metal is still very hot and, therefore, is soft and easy to cut. The shearing is initiated by operating the piston and cylinder assembly 345 to extend the shear box 342 until the latter reaches the position shown in FIG. 2 where the shearing blades 343 are located near the hot weld upset 344. After the shear box 342 has been advanced, it is locked to the carriage 321 by again extending the pair of vertical clamps 325 and 326 and the pair of horizontal clamps including the clamp 350.

At this time, as is best shown in FIG. 2, the clamps are no longer aligned with their associated insert plate (the plate 351 for the clamp 325) and shear box opening (the opening 354 for the clamp 326) but instead they engage external surface portions of the shear box 342 to lock the box to the carriage 321. The rail is, of course, freely supported within the shear box to permit operation of the piston and cylinder assembly 335 in order to move the carriage 321 and the shear box to the left from the position shown in FIG. 2, this movement being accompanied by the rollers 348 and 349 rolling along the top of the rail. The very large carriage moving force available from the pneumatically operated piston and cylinder assembly 335 is sufficient to drive the shearing blades 343 through the upset metal 344, thus shearing off the major portion of this upset region while the metal is still very hot from the weld. To this end, the shearing blades 343 are contoured to approximate the size of the rail. These blades are made in separable sections each formed of an alloy steel suitable for shearing the hot metal of the upset 344 and each section is keyed to the box to insure its proper alignment. In the form of the invention illustrated in FIGS. 1 to 5, these blades have been found effective to shear the upset to within 1/32 of an inch of the rail size along the rail head and the rail base while leaving a somewhat thicker region along the rail web. The blade sections are suitably affixed to the ends of the shear box 342 as, for example, by means of bolts 355 having their heads seated within appropriate recesses in the blades and having stems threaded into tapped bolt receiving bores extending into the end of the shear box. This arrangement insures proper positioning of the blade sections on the end of the shear box. The cutting edges of the separable blade sections are stepped so that all of these edges do not begin to shear the upset 344 at the same time, an arrangement which reduces the force required from the piston and cylinder assembly 335 and, at the same time, distributes the load among the blade sections to avoid excessive wear. More specifically, the upper blade section 356 includes a forwardly extending cutting projection 357 which tapers back into cutting edges 358 and 359. The cutting edges 357, 358 and 359 cooperate to shear the upset 344 along the top running surface of the rail. The cutting edges 358 and 359 taper downwardly as indicated at 360 and 361, respectively, to follow the two side edges of the rail head. The two side blade sections 362 and 363 include inwardly and forwardly projecting cutting edges 364 and 365, respectively, for shearing off the upset portion 344 along the two side edges of the rail web. The two side cutting edges 364 and 365 each taper rearwardly from an apex or point indicated at 366 in FIG. 4 for the cutting section 364. The lower edge of each of the sections 362 and 363 flares outwardly to accommodate the top of the rail base and to shear off the upset portion 344 in this region. At the base of the rail, two blade sections 368 and 369 serve to shear the two side edges of the rail base. The bottom of the rail base is sheared by a lower blade section 370 having a forwardly extending cutting projection 371 extending outwardly for approximately the same distance as the upper projection 357 and cooperating with portions tapering rearwardly from both sides of the projection 371 to form cutting edges. The blade sections 368 and 369 are reversible so that either side edge may act as the cutting blade, an arrangement which effectively doubles the useful operating life of these blade sections.

Referring now to the operation of the welding and shearing apparatus 54, it will be observed that at the beginning of the welding cycle, the pair of stationary vertical clamps 323 and 324 and the pair of horizontal stationary clamps including the clamp 319 are actuated to hold the continuous rail in fixed position with its trailing end located at the position shown in FIG. 1 preparatory to beginning the welding operation. The front or forward end of the rail section 67 is clamped to the carriage 321 by moving the pair of vertical clamps 325 and 326 and the pair of horizontal clamps including the clamp 350 to their extended positions. The two pairs of clamps (323, 324, 319) on the base 320 may be referred to as the stationary clamps since they are mounted upon the stationary base while the two pairs of clamps (325, 326, 350) on the carriage 321 may be referred to as the movable clamps since they are carried by the movable carriage. At this time, the clamp 325 is seated against the insert 351 in the shear box 342 while the clamp 326 extends through the opening 354 and into engagement with the underside of the rail base. In similar manner, one of the horizontal clamps seats upon an insert similar to the insert 351 while the other horizontal clamp extends through an opening in the side wall of the shear box. At this time, the alignment between the leading end of the rail section 67 and the trailing end of the continuous rail 322 is checked and, if this alignment is not within the allotted tolerances, the pairs of the stationary and movable clamps are all released and the stop members of one or more of these pairs are adjusted, whereupon the clamps are again applied and the alignment is rechecked. An experienced operator will be able to determine which of the stop members should be adjusted and the approximate amount of adjustment necessary. In any event, the above described procedure is repeated until the rails are properly aligned at which time the clamps are all extended. When the movable clamps are extended, the forward end of the rail section 67 is securely clamped to the movable carriage 321 and, at this time, air under pressure, for example, 150 p.s.i., is admitted to the piston and cylinder assembly 335 to begin the movement of the carriage from its retracted position to its extended position. The latching mechanism 372 is effective to lock the shear box 342 in retracted position. The piston and cylinder assembly 335 is rendered effective to reciprocate the carriage 321 and, at the same time, to advance the carriage gradually to the left as the welding cycle progresses, thus flashing the ends of the rails to heat them. Near the completion of the welding cycle, the piston and cylinder assembly 335 is rendered effective to apply a large force to the carriage 321 in order to push the rail section 67 against the end of the continuous rail 322 to form the joint, at the same time, creating the upset region 344. When the weld has been completed, the horizontal and vertical clamps on the movable carriage are released and the movable carriage 321 is returned to its retracted position by operation of the piston and cylinder assembly 335.

When the movable carriage 321 has been fully retracted, the latching mechanism 372 is released and the piston and cylinder assembly 345 is rendered effective to extend the shear box 342 by moving it from the position shown in FIG. 1 to that shown in FIG. 2. The horizontal and vertical clamps on the movable carriage 321 are then reapplied but, at this time, they engage the walls of the shear box 342 since they are no longer aligned with the inserts and the openings in the shear box. When the horizontal and vertical clamps engage the walls of the shear box, the shear box is securely locked to the carriage 321 and, at this time, the piston and cylinder assembly 335 is again rendered operative to move the carriage 321 from its retracted position to its extended position. A force of approximately fifty tons is exerted on the movable carriage and this force is sufficient to drive the shearing blades 343 through the upset 344 with the result that a major portion of the upset metal is sheared off prior to feeding the continuous rail to suitable grinding equipment for removing the remaining portion of the upset. Immediately after the shearing has been completed, the piston and cylinder assembly 335 is rendered effective to return the movable platen to its retracted position and the horizontal and vertical clamps on the carriage 321 are released. The shear box is then retracted by operation of the piston and cylinder assembly 345 where it is latched by the mechanism 372. The operation of the welding and shearing apparatus may be completely automatic or, alternatively, these operations may be performed by operation of suitable manually operated control switches which are actuated at the proper times to effect the sequence of operation described above.

When an automatic cycle is employed, suitable limit switches are used to control the cycle of operation. Thus, for example, when the shear box 342 is extended, a shear box advanced limit switch LS–SBA is closed by engagement of its operating arm 376 by a switch operating collar 377 secured in fixed position upon the piston rod 346. When the shear box is retracted, the collar 377 engages an actuating arm 378 of a shear box retracted limit switch LS–SBR in order to provide a control signal indicating that the shear box has been returned to its retracted position. Similarly, when the movable carriage 321 is in its retracted position, a switch engaging arm 380 (FIG. 18) carried on the piston rod 340 engages a switch actuating roller 381 to close a movable platen retracted limit switch LS–MPR to indicate that the movable platen has been retracted. When the movable carriage is in its extended position, the arm 380 engages an actuating arm 382 to close a movable platen advanced limit switch LS–MPA in order to indicate that the movable carriage has been extended or applied. Similar limit switches may be employed for operation when the horizontal and vertical stationary clamps are extended and retracted and when the horizontal and vertical clamps on the movable carriage and the two pairs of electrodes 327, 328 and 331, 332 are extended and retracted but, in the interest of simplicity, these limit switches are not illustrated in FIGS. 1 and 2. In this connection, it should be understood that each of the clamps and each of the electrodes has associated therewith a pair of limit switches, one for indicating that the device has been moved to its extended position and the other for indicating that the device has been retracted. These limit switches are connected in an electrical control circuit of the type described in detail in copending application Serial No. 808,786, of Robert A. Baer et al. which is assigned to the same assignee as the present invention and which was refiled as application Serial No. 112,167, now U.S. Patent No. 3,030,494.

While there has been illustrated a particular embodiment of the present invention, it should be understood that many modifications will be apparent to those skilled in the art and it is, therefore, intended in the appended claims to cover all such modifications falling within the true spirit and scope of the invention.

What is claimed as new and is desired to be secured by Letters Patent of the United States is:

1. In an apparatus for removing excess weld material from a weld joining together the adjacent ends of a pair of end to end rail sections, the combination of a carriage movable longitudinally of the rail sections; means for moving said carriage; a shearing box movable along said carriage and comprising wall portions extending along the opposed sides and the top and bottom of one of the rail sections to form a hollow structure surrounding said one rail section, roller means mounted in one of the wall portions for engaging said one rail section to permit movement of the box longitudinally of the rail sections and along the carriage from a retracted position to an advanced position, drive means operably connected to the box for moving it, and a plurality of shearing blades secured to the box and arranged around said one rail section for engaging the weld; and clamping means operable when said box is in its advanced position to clamp said box to said carriage whereupon said carriage may be moved in a direction to force the blades through the weld.

2. In an apparatus for welding together the ends of aligned rail sections and for thereafter shearing off a portion of the excess weld material, the combination of a carriage mounted for reciprocal movement longitudinally of the rail sections from a retracted position to an advanced position, means for moving said carriage, a shearing apparatus mounted for movement longitudinally of the rail sections and independently of the carriage from a retracted position to an extended position, means for moving said shearing apparatus, clamping means on said carriage for locking the shearing apparatus to the carriage, means for selectively moving said clamping means between an extended position wherein it is effective to clamp the shearing apparatus to the carriage and a released position wherein it is effective to release the shearing apparatus for movement independently of the carriage, and means for controlling the movements of the carriage and the shearing apparatus and for controlling the operation of the clamping means so that to shear the excess weld material the shearing apparatus is moved to its extended position, the clamping means is extended to lock the shearing apparatus to the carriage and the carriage is advanced to drive the shearing apparatus through the excess weld material.

3. The structure defined by claim 2 wherein the shearing apparatus comprises a plurality of shearing blades detachably mounted upon one end of a shearing box surrounding a first of the rail sections, said blades being arranged around the first rail section and including portions extending different distances longitudinally of said first rail section from said one end of the shearing box to form a stepped arrangement wherein the different blade portions engage the weld at different times when the movable structure is advanced.

4. In an apparatus for removing excess weld material formed as an upset surrounding a weld joining together the adjacent ends of a pair of end to end rail sections, a carriage mounted for movement longitudinally of the rail sections, a plurality of clamps movably mounted on said carriage, a box mounted for movement along said carriage and comprising top and bottom wall portions respectively extending along the top and bottom of one of the rail sections and side walls cooperating with top and bottom wall portions to form a hollow structure surrounding said one rail section, one wall portion of said box including a first opening having a first insert plate disposed therein for engagement by a first of said clamps and the other wall portion including a second unobstructed opening in alignment with the first opening and extending from the interior to the exterior of the hollow structure for accommodating a second of said clamps, and the side walls of the box being respectively provided with third and fourth aligned openings one of which is unobstructed for receiving a third of said clamps and the other of which receives a second insert plate for engagement by a fourth of said clamps, whereby said four clamps cooperate with said plates and with said unobstructed openings to clamp said one rail section to said carriage.

5. The apparatus defined by claim 4 which further comprises a plurality of spaced apart rollers resiliently mounted in the top wall portion of the box and engaging the top of said one rail section to facilitate movement of the box therealong.

6. The apparatus defined by claim 1 wherein the roller means comprise a plurality of spaced rollers on the top wall portion of the shearing box together with means resiliently mounting each roller for limited movement transversely of said one rail section.

7. The apparatus defined by claim 1 wherein said blades include portions extending different distances longitudinally of said one rail section and away from one end of the shearing box so that all of the blade portions do not engage the weld at the same time when the carriage is advanced.

8. The apparatus defined by claim 7 wherein the roller means comprise a plurality of spaced apart rollers on the top wall portion of the shearing box together with means resiliently mounting each roller for limited movement transversely of said one rail section.

9. The apparatus defined by claim 2 wherein the shearing apparatus comprises a hollow box surrounding one of the rail sections and mounted for movement longitudinally thereof together with shearing blade means carried by the box for engaging and cutting the excess weld material.

10. The apparatus defined by claim 4 wherein roller means are carried by said box in engagement with said one rail section to facilitate movement of the box therealong.

11. The apparatus defined by claim 4 wherein the box carries a plurality of shearing blades detachably mounted at one end thereof, said blades being arranged around said one rail section and including portions extending different distances longitudinally of said one rail section from said one end of the shearing box to form a stepped cutting blade arrangement wherein the different blades engage the weld at different times when the movable structure is advanced.

12. The apparatus defined by claim 10 wherein the box carries a plurality of shearing blades detachably mounted upon one of its ends, said blades being arranged around said one rail section and including portions extending different distances longitudinally of said one rail section from said one end of the box to form a stepped cutting arrangement wherein the different blade portions engage the weld at different times when the carriage is advanced.

References Cited in the file of this patent

UNITED STATES PATENTS

| | | |
|---|---|---|
| 1,759,327 | Schultz | May 20, 1930 |
| 1,995,104 | Morton | Mar. 18, 1935 |
| 2,124,849 | Drain | July 26, 1938 |
| 2,212,393 | Dalton | Aug. 20, 1940 |
| 2,272,737 | Chapman | Feb. 10, 1942 |
| 2,654,292 | Pearson | Oct. 6, 1953 |
| 2,787,698 | Schlatter | Apr. 2, 1957 |
| 3,030,494 | Baer et al. | Apr. 17, 1962 |

FOREIGN PATENTS

| | | |
|---|---|---|
| 716,764 | Great Britain | Oct. 13, 1954 |